United States Patent [19]
Ishikawa et al.

[11] Patent Number: 5,631,838
[45] Date of Patent: May 20, 1997

[54] APPARATUS FOR VERIFYING GPS SATELLITE DATA

[75] Inventors: Seiji Ishikawa, Kariya; Yuichi Murakami, Chiryu; Tomio Yasuda, Kariya; Tomohiro Yamamoto, Anjou; Toshimitsu Oka, Okazaki, all of Japan

[73] Assignee: Aisin Seiki Kabushiki Kaisha, Kariya, Japan

[21] Appl. No.: 614,941

[22] Filed: Mar. 11, 1996

Related U.S. Application Data

[63] Continuation of Ser. No. 284,247, Aug. 2, 1994, abandoned.

[30] Foreign Application Priority Data

Aug. 2, 1993 [JP] Japan .................... 5-191190

[51] Int. Cl.⁶ ............................................ G06F 19/00
[52] U.S. Cl. ............................................ 364/449.9
[58] Field of Search .................... 364/434, 454, 364/459, 443, 449, 453; 244/176; 342/357

[56] References Cited

U.S. PATENT DOCUMENTS

| | | | |
|---|---|---|---|
| 5,187,485 | 2/1993 | Tsui et al. | 342/357 |
| 5,193,064 | 3/1993 | Maki | 364/454 |
| 5,225,842 | 7/1993 | Brown et al. | 342/357 |
| 5,317,323 | 5/1994 | Kennedy et al. | 342/457 |
| 5,317,514 | 5/1994 | Bancroft et al. | 364/449 |
| 5,363,110 | 11/1994 | Inamiya | 342/357 |
| 5,365,447 | 11/1994 | Dennis | 364/449 |
| 5,390,124 | 2/1995 | Kyrtsos | 364/449 |

FOREIGN PATENT DOCUMENTS 61-137009  7/1986  Japan.

OTHER PUBLICATIONS

Parkinson et al., "NAVSTAR: Global Positioning—Ten Years Later", Proceedings of the IEEE, vol. 71, No. 10, Oct. 1983, pp. 1177–1186.

*Primary Examiner*—Kevin J. Teska
*Assistant Examiner*—Stephen J. Walder, Jr.
*Attorney, Agent, or Firm*—Sughrue, Mion, Zinn, Macpeak & Seas

[57] ABSTRACT

A length of time required for the verification of data transmitted from a satellite or satellites is reduced. A distance r1 calculated from a time delay required for the propagation of a radio wave between a transmitting and a receiving site is obtained, as is a line-of-sight distance r2 which is calculated from the positions of a satellite and a point of reception. When a difference between these two distances is small, data from these satellites are regarded as valid data. However, when the difference is large, data is regarded as involving a large error. The position of the point of reception is determined by a positioning calculation which utilizes data from predetermined three or four verified satellites, or is entered by an operator. The position of the satellite is obtained from orbital data which is delivered by that satellite.

11 Claims, 6 Drawing Sheets

APPARATUS FOR VERIFYING GPS SATELLITE DATA

This is a Continuation of application Ser. No. 08/284,247 filed Aug. 2, 1994 now abandoned.

FIELD OF THE INVENTION

The invention relates to a verification of GPS satellite data.

BACKGROUND OF THE INVENTION

Recently, the determination of a position of an automobile which is provided with an onboard vehicle navigation system takes place by utilizing information which is available from GPS (global positioning system) satellite. Such positioning technology is disclosed, for example, in Japanese Laid-Open Patent Application No. 137,009/1986.

A satellite transmits information indicating a predetermined orbit of the satellite and an exact timing when such information is delivered from the satellite. The position of the satellite can be determined on the basis of such information, and also a distance between the satellite and a point of reception can be determined from a time delay involved with the propagation of a radio wave which carries such information. Accordingly, where information from four satellites is simultaneously available, simultaneous equations can be set up from information obtained from the individual satellites and can be solved to determine the position of the point of reception in three dimensions (latitude, longitude and altitude) and any error associated with a clock associated with a receiver in an accurate manner. Where the altitude is already known, the latitude, the longitude and any error of the clock can be detected on the basis of information available from three satellites. In addition, such positioning is also enabled if the number of available satellites is equal to two or less through an auxiliary use of an acceleration sensor, for example.

However, in actuality, it is not assured that information delivered from all the satellites is always maintained to be correct. For example, in the event the actual orbit of a satellite largely deviates from a predetermined orbit, it takes a considerable length of time until orbital information delivered from that satellite is corrected, giving rise to the likelihood that orbital information containing a large magnitude of error may be received. A positioning error of a large magnitude then results if the positioning calculation is based on such uncorrected information.

Accordingly, it is apparent that a verification to see if information delivered from a satellite or satellites is correct is very important. In particular, since the number of satellites which are simultaneously available is limited, it is necessary to verify the reliability of information from all the satellites which are then available and to conduct a positioning process on the basis of information for which any error is minimized in order to enhance the positioning accuracy. Procedures which were used in the prior art in order to verify satellite information will be described below.

By way of example, assume now that there are four satellites, A, B, C and D for which the reliability of data has been verified, and that another satellite E has now become available and requires the verification of the reliability of data from this satellite E. Initially, a positioning process is conducted on the basis of information from four verified satellites A, B, C and D to yield a positioning result Pabcd. Then, a positioning process is repeated on the basis of information from four satellites A, B, C and E to produce a positioning result Pabce. Subsequently, a positioning process with information from four satellites A, B, E and D produces a positioning result Pabed, followed by a positioning process on the basis of information from four satellites A, E, C and D to produce a positioning result Paecd, which is then followed by a final positioning process conducted on the basis of information from four satellites E, B, C and D which produces a positioning result Pebcd. These five positioning results are then paired, and a difference in each pair (Pabcd–Pabce, Pabce–Pabed, Pabed–Paecd, Paecd–Pebcd, Pebcd–Pabcd, ...) is examined. If all of these differences are relatively small in magnitude, it follows that information from the new satellite E has a small error involved, and hence may be utilized in the positioning process. However, if one of these differences is found to be large in magnitude, it follows that information from the satellite E involves a large error, and hence cannot be utilized.

Where an exact position of the point of reception is already known, a positioning process is conducted utilizing information from various combinations of satellites to produce respective positioning results Pabce, Pabed, Paecd, Pebcd. A difference between each of such positioning result and the actual position is examined. If all of these differences are relatively small in magnitude, it may be concluded that any error involved with information from the new satellite E is small, and hence such information can be utilized. However, if one of these differences exhibits a large magnitude, it follows that information from the satellite E may involve an error of an increased magnitude, and hence information from the satellite E cannot be utilized.

When verifying the reliability of satellite data in the manner mentioned above, it is necessary to repeat the positioning calculation for each verification, and such positioning calculation must be repeated a number of times which is equal to the number of combinations of all the satellites. However, such positioning calculation is a very complex process, unavoidably requiring an increased length of time to verify the reliability of data.

SUMMARY OF THE INVENTION

It is a task of the invention to enable the verification of the reliability of data delivered from GPS satellite or satellites in a brief length of time.

The above task is accomplished in accordance with the invention by providing an apparatus for verifying GPS satellite data comprising receiver means (11, 12) for receiving information from a GPS satellite or satellites which deliver information relating to its own orbit and a timing thereof; positioning calculation means (2C, 2E) for determining the position of a point of reception on the basis of information from a plurality of GPS satellites which are received by the receiver means; first distance calculating means (63) for calculating a distance between a selected one of the GPS satellites and the point of reception on the basis of information relating to the position of GPS satellites and the point of reception which are determined from the orbital information received; second distance calculating means (27, 28) for determining a time delay which is required for the propagation of information from the GPS satellite to reach the point of reception after its delivery on the basis of received information relating to the timing and the point in time when the timing information is received and for calculating a distance between the GPS satellite and the point of reception from such time delay; and verifying means (64, 65, 66) for obtaining a difference between the distance determined by the first distance calculating means and a distance determined by the second distance calculating means, and in response to such determination, for registering the GPS satellite as one which is available in the calculation by the positioning calculation means whenever the difference has a relatively small magnitude, and for registering the GPS satellite as one which is unavailable to the calculation by the positioning calculation means whenever the difference has a relatively large magnitude.

In a preferred embodiment, the first distance calculating means is arranged to calculate a distance between a particular one of the GPS satellites which is being verified and the point of reception by utilizing positional information (Ux, Uy, Uz) determined by the positioning calculation means on the basis of information from three or more verified GPS satellites as information which represents the position of the point of reception.

It is to be understood that numerals and characters appearing in parentheses above correspond to reference numerals and characters used to designate corresponding elements appearing in an embodiment to be described later, but it should be understood that the components of the invention are not limited to specific elements shown in such embodiment.

As described, information delivered from the GPS satellite and relating to its own orbit and timing of such delivery is received by the receiver means. Positioning calculation means determines the position of the point of reception from information received by the receiver means from a plurality of GPS satellites. Such calculation for positioning purpose can be carried out in a known manner.

The first distance calculating means determines a line-of-sight distance between a particular one of the GPS satellites and the point of reception on the basis of information relating to the position of the GPS satellite and the position of point of reception which are determined from orbital information received. At this end, information representing the position of the point of reception which was previously obtained by the positioning calculation means may be used, or alternatively positional information which is entered by an operator may be used whenever the position of the point of reception is already known.

The second distance calculating means determines a time delay which is required for the propagation of information delivered from the GPS satellite to reach the point of reception on the basis of received timing information and the point in time when such timing information is received, and calculates a distance between the GPS satellite and the point of reception from such time delay. Since the speed of propagation of a radio wave is constant, equal to the speed of light, the distance travelled by the radio wave during the interval of the time delay is equivalent to a distance between the GPS satellite and the point of reception, which is to be determined.

The verifying means determines a difference between the distance obtained by the first distance calculating means and the distance obtained by the second distance calculating means, and registers the GPS satellite as one which is available in the calculation by the positioning calculation means whenever such difference has a relatively small magnitude, and registers the GPS satellite as one which is unavailable in the calculation by the positioning calculation means whenever the difference has a relatively large magnitude.

The distance obtained by the first distance calculating means is obtained on the basis of orbital information from the satellite while the distance obtained by the second distance calculating means is determined on the basis of timing information from the satellite. It will be seen that the distance obtained by the second distance calculating means varies with the actual position of the satellite. Accordingly, if both the orbital and timing information from the satellite are correct, the difference between the distance obtained by the first distance calculating means and the distance obtained by the second distance calculating means will be relatively small in magnitude. However, if either orbital or timing information from the satellite is erroneous, the difference between these distances will be relatively large in magnitude. Accordingly, by examining the magnitude of the difference, it is possible to determine if information from the satellite is correct or if such satellite may be utilized in the positioning operation.

In a preferred embodiment, the first distance calculating means utilizes the position determined by the positioning calculation means on the basis of information delivered from three or more verified GPS satellites as the position representing the point of reception in calculating the distance between the GPS satellite being verified and the point of reception. By carrying out the positioning calculation utilizing three or more GPS satellites prior to the verification of information, it is possible, on any mobile vehicle located at any location, to verify information from the satellites. In addition, since a clock of the apparatus can be corrected, there is obtained a result of verification which exhibits a high level of reliability.

DETAILED DESCRIPTION OF PREFERRED EMBODIMENT

Figure 1:
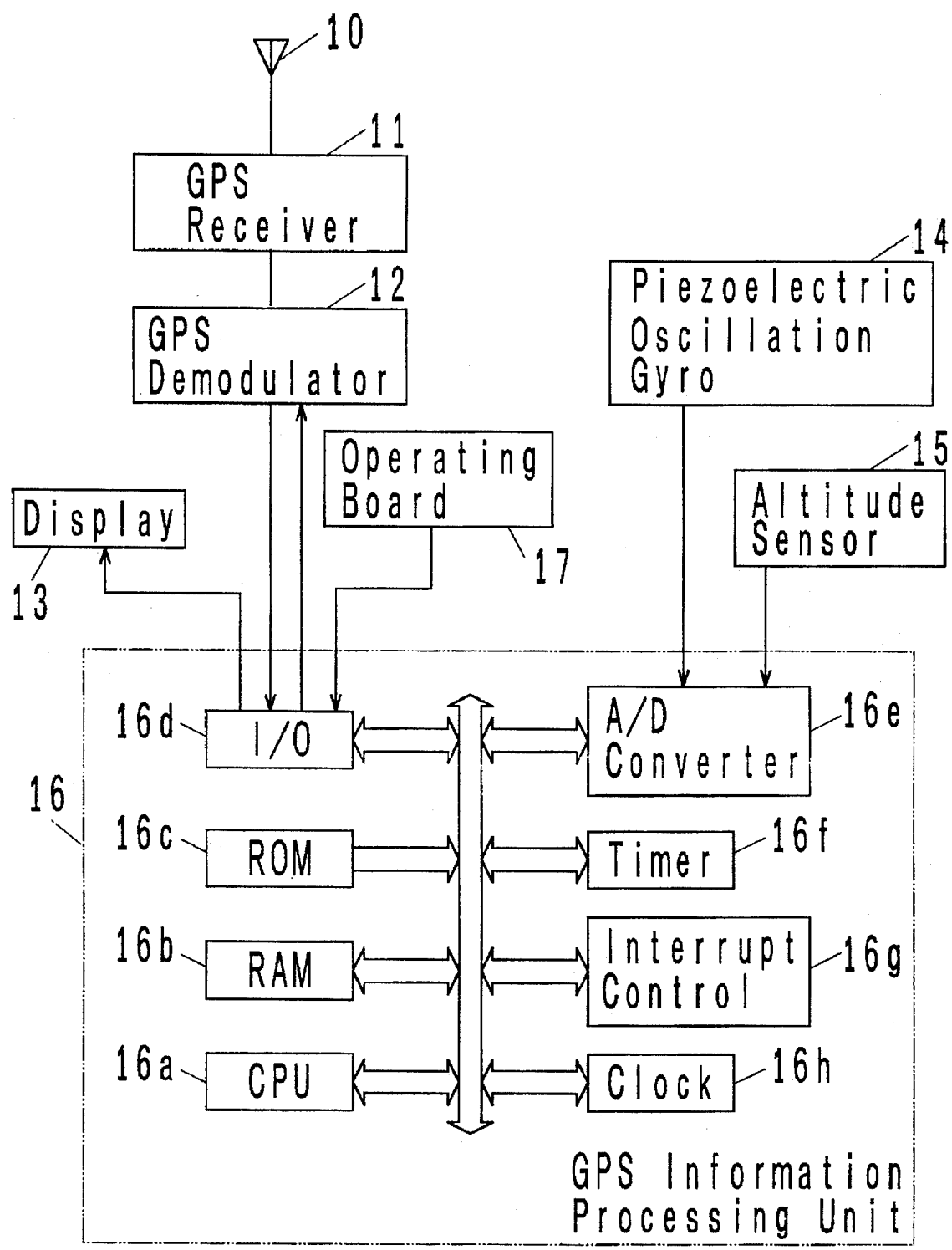
FIG. 1 is a block diagram of an apparatus according to one embodiment of the invention.

A GPS positioning apparatus according to an embodiment of the invention is shown in FIG. 1. The apparatus is mounted onboard an automobile which runs on the ground, and includes a receiving antenna 10, GPS receiver 11, GPS demodulator 12, display 13, piezoelectric oscillation gyro 14, altitude sensor 15, GPS information processing unit 16 and an operating board 17. A radio wave of 1.5742 GHz transmitted from each of GPS satellites is received through the receiving antenna 10 by the GPS receiver 11, and information carried by the radio wave, namely, information representing a function indicative of the orbit of a satellite and the current timing, is demodulated by the GPS demodulator 12 to be input to the GPS information processing unit 16. The unit 16 basically produces information, including latitude, longitude and altitude, representing the position of an own vehicle, on the basis of information delivered from the GPS satellites, and outputs such information to the display 13. A basic arrangement including the antenna 10, the receiver 11, the demodulator 12 and the display 13 as well as a fundamental operation of the GPS information processing unit 16 remains similar to those of a commercially available arrangement.

Where radio waves from four GPS satellites can be received simultaneously, the position of the own vehicle can be exactly determined through calculation which utilizes only information carried by the radio waves. The position of the own vehicle can also be calculated if the number of the available GPS satellites is equal to three or less, by utilizing a reference to information which is output from the piezoelectric oscillation gyro 14 and the altitude sensor 15. The gyro 14 is fixedly mounted onboard, and delivers a signal having a level which is proportional to the angular speed of rotation ω about the vertical axis of the vehicle.

GPS information processing unit 16 is a computer system including CPU (microprocessor) 16a, RAM 16b, ROM 16c, I/O port 16d, A/D converter 16e, timer 16f, interrupt control circuit 16g and a clock 16h. The gyro 14 and the altitude sensor 15 output analog signals, which are input to A/D converter 16e and hence to CPU 16a. Information which is output from the demodulator 12 and information which controls the demodulator 12 are fed through I/O port 16d.

Figure 2:
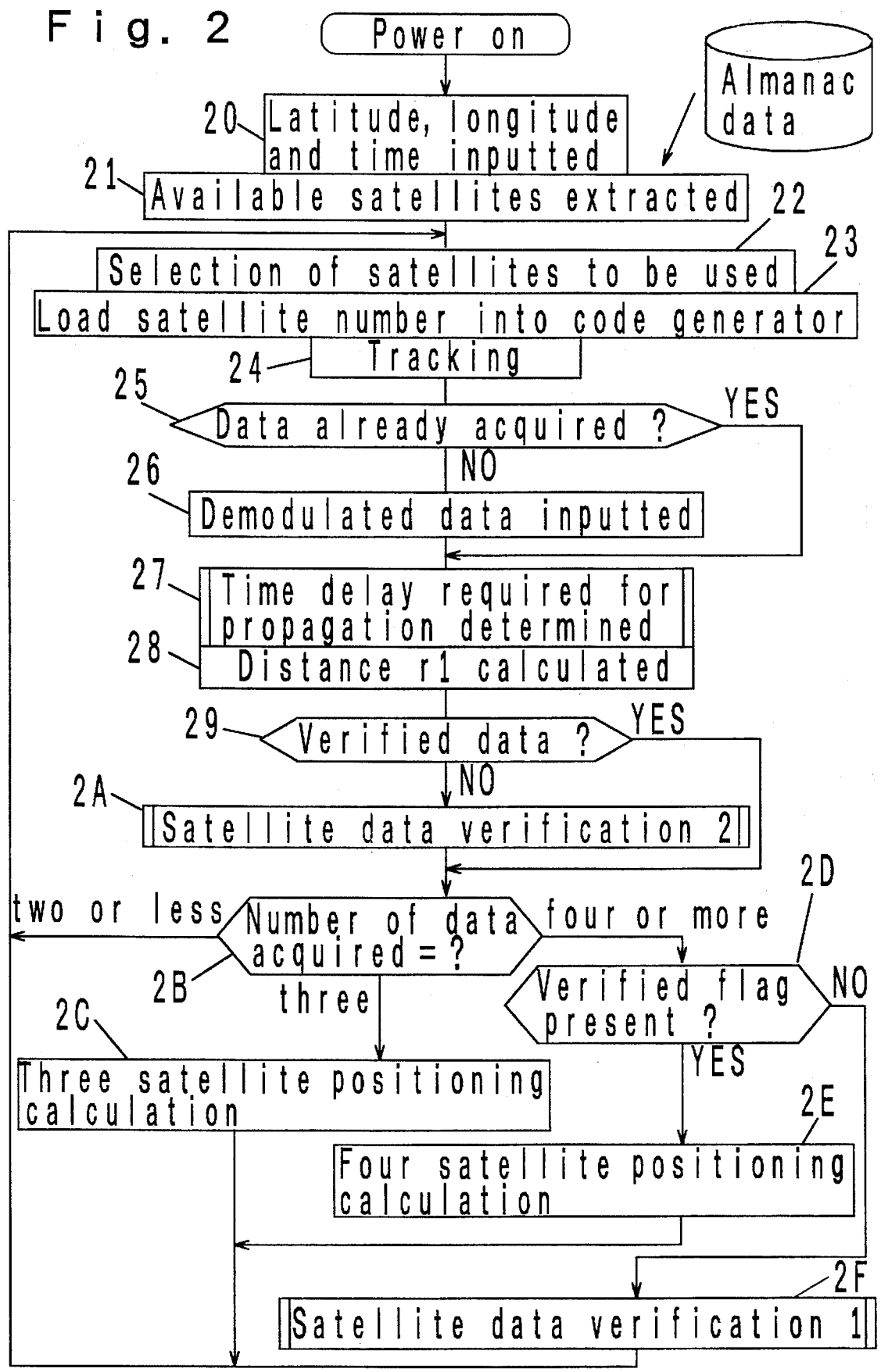
FIG. 2 is a flow chart illustrating the operation of CPU 16a shown in FIG. 1.

A summary of the operation performed by CPU 16a of the GPS information processing unit 16 is illustrated in FIG. 2. Referring to FIG. 2, when the power supply is turned on, the microprocessor proceeds to a step 21. At previous step 20, latitude, longitude and current time are entered. An operator enters specific numerical values representing such information by utilizing the operating board 17, thus initializing the latitude, the longitude and the time. In the absence of any numerical input from the operator, the latitude and the longitude are governed by positional information which were entered immediately before the power supply of the apparatus is interrupted, and the time is set up in accordance with the internal clock 16h.

At step 21, a selection is made to choose those from a number of GPS satellites which are available at that time. This takes place by referring to Almanac data pre-stored in the internal memory 16c and representing the positions of the individual GPS satellites which vary from time to time. By referring to such data, the position of each individual GPS satellite at the current time may be determined, and an angle of elevation when each satellite is viewed from the own vehicle is calculated on the basis of the positions of the satellites and the position of the own vehicle, and only those GPS satellites which exhibit angles of elevation equal to or greater than a given value are extracted in terms of their identification numbers. Where the number of extractable satellites is equal to 6 or greater, only five GPS satellites are extracted which exhibit small predicted error (PDOP).

At next step 22, one of GPS satellites which are extracted at step 21 is chosen for receiving data therefrom. The chosen GPS satellite is changed upon completion of the step 22 during each pass.

At step 23, the identification number of the GPS satellite chosen at step 22 is set up in a code generator of the GPS demodulator 12. A radio wave transmitted from a GPS satellite is subjected to a spectral dispersion in accordance with PN-code (Gold code comprising a sequence of 1023 bits) which is assigned to the particular satellite. Accordingly, in order to demodulate information transmitted from the GPS satellite, it is necessary to apply an inverse spectral dispersion in accordance with the same PN-code on the received signal as that used on the transmitting side. The PN-code of each GPS satellite is known and is registered in Almanac data. Accordingly, the PN-code of a particular satellite from which data is to be received is taken from the Almanac data and set up in the code generator.

At step 24, a tracking is carried out between the PN-codes of the transmitting and the receiving side. If the PN-codes are identical on the transmitting and the receiving side, the inverse spectral dispersion cannot apply unless they coincide with each other in phase, and hence it is necessary to bring the both PN-codes into phase. In actuality, a PN-code on the receiving side is generated at a bit rate (equal to 1.024 Mbps) which is slightly higher than the bit rate on the transmitting side (1.023 Mbps), whereby during the period of the PN-code, the phase of the PN-code on the receiving side will be displaced by one bit with respect to the phase of the PN-code on the transmitting side, thus creating a phase difference which varies with time. Thus, by controlling the bit rate of the code generator so that the bit rate on the receiving side becomes equal to that on the transmitting side at the moment when a phase difference between the PN-codes on the transmitting and the receiving side is eliminated, a synchronization of the phase of the PN-codes is achieved. When the phase synchronization is achieved, there appears a signal at the output of the demodulator.

Figure 3:
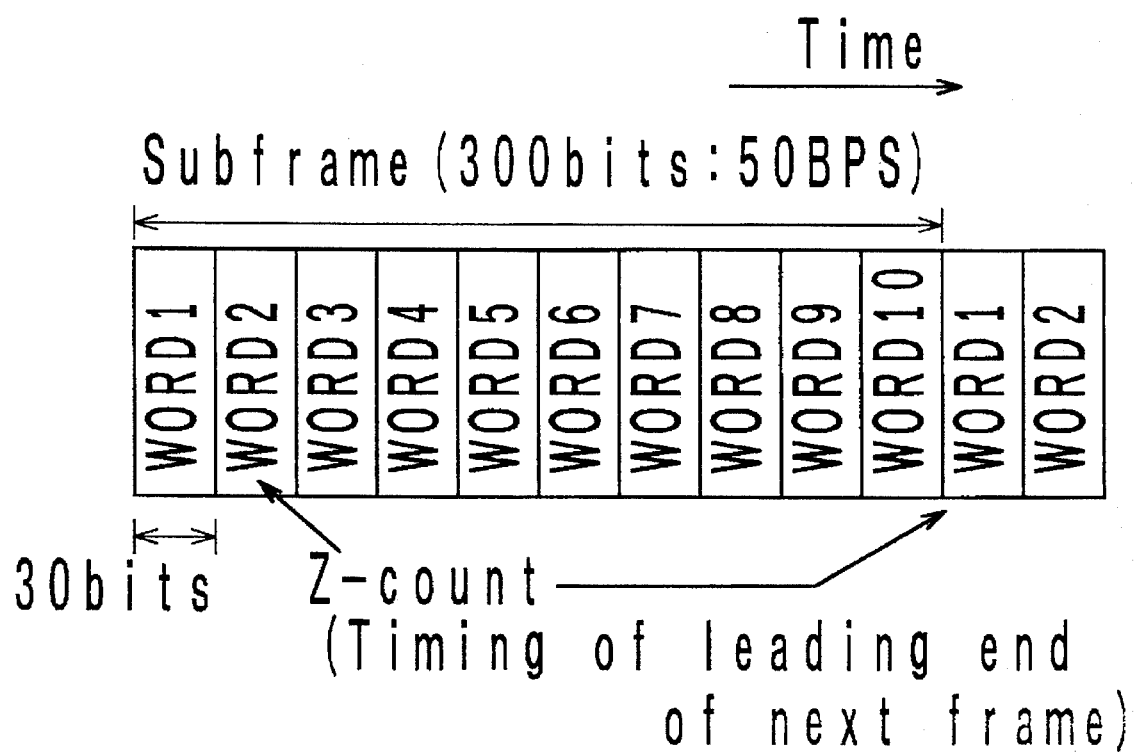
FIG. 3 is a timing chart showing the arrangement of data transmitted from a satellite.

When a phase error between the PN-codes on the transmitting and the receiving side is reduced within a given limit, the operation proceeds through step 25 to step 26 where the entry of demodulated data is initiated. A signal transmitted from the GPS satellite is a binary signal having a bit rate of 50 bps which form a subframe comprising 300 bits as shown in FIG. 3, which is repeated. Each subframe comprises word 1 to word 10, each of which comprises 30 bits. The data of the subframe contains a preamble which allows a frame synchronization, Z-count indicating the time of transmission, ephemeris representing an orbit of a satellite, Almanac and the like. The preamble is initially detected to achieve a frame synchronization and various data which follow is stored in a memory at addresses corresponding to the individual bit positions.

Figure 4:
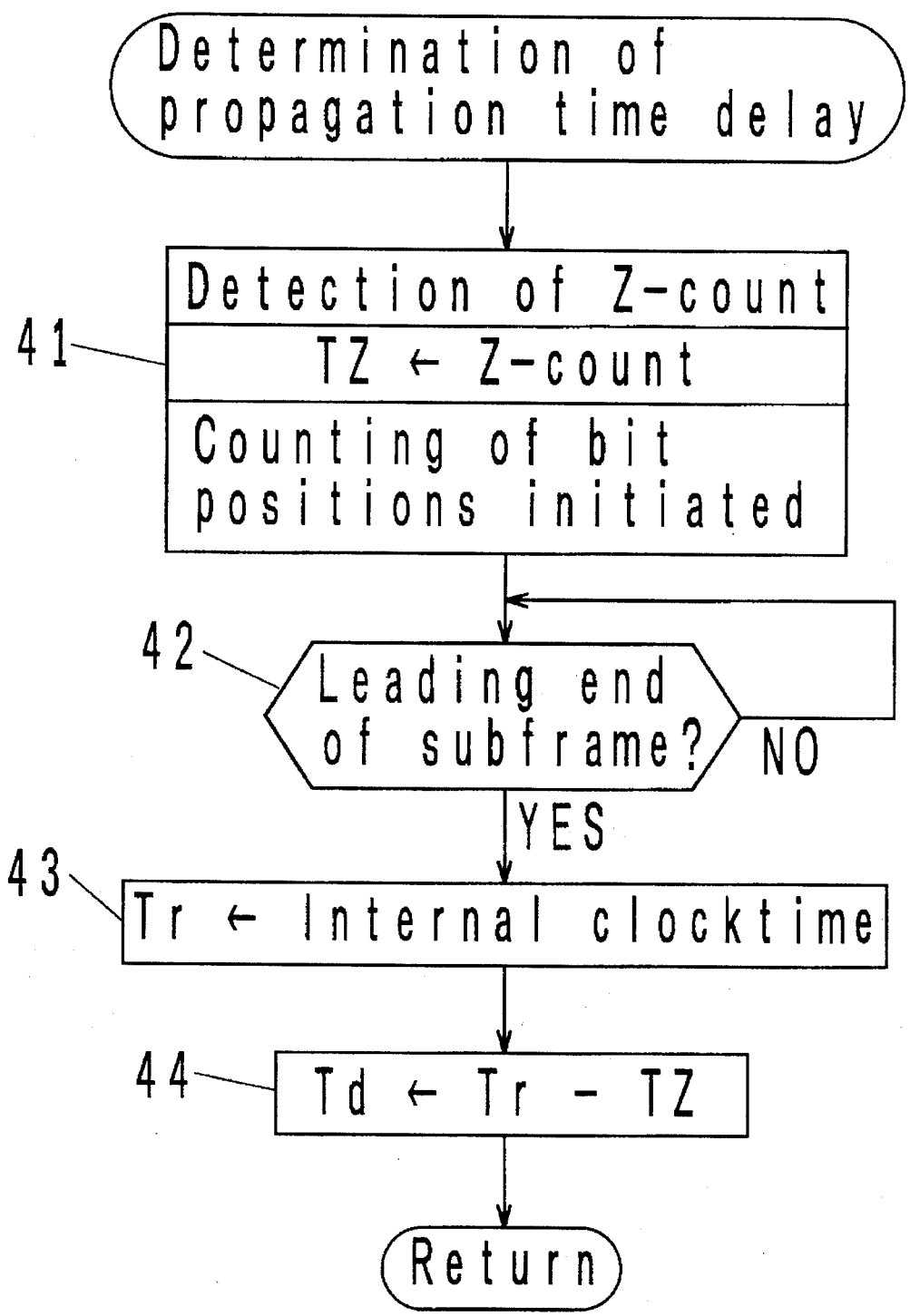
FIG. 4 is a flow chart showing a step 27 shown in FIG. 2 in detail.

At next step 27, a time delay required for the propagation of the radio wave transmitted from the satellite to reach the point of reception is determined. The detail of this determination is specifically shown in FIG. 4. Referring to FIG. 4, time data referred to as Z-count is initially detected at step 41. As shown in FIG. 3, Z-count is contained in word 2 of each subframe of the transmission data, and the detected content is stored in a memory TZ and a counting of the bit position is resumed.

The Z-count indicates a predetermined point in time when the leading end of the next following subframe is to be transmitted, and exhibits a high accuracy. Accordingly, a difference between the point in time when the leading end of the next subframe is detected on the receiving side and the time represented by the Z-count is equivalent to the time delay required for the propagation of the radio wave between the transmitting and the receiving site. However, the timing of the leading end of the next subframe must be exactly detected at that moment without involving any delay. At this end, after the detection of the Z-count, any subsequent bit position is continuously counted to keep track of the bit position at step 41. At step 42, the leading end of the leading bit of the next subframe is waited for. When the leading edge of the leading bit of the next subframe which follows the detection of the Z-count appears, the operation proceeds from step 42 to step 43 where the time indicated by the internal clock 16h is stored in a memory Tr.

At following step 44, the content of the memory TZ is subtracted from the content of the memory Tr, and the difference is stored in a memory Td. The difference represents a time difference between the point in time as represented by the Z-count and the actual time of reception. While it is not assured that the time indication of the internal clock 16h is always exact, if we assume that any error involved is sufficiently small, the content of the memory Td coincides with the time delay required for the propagation of the radio wave between the transmitting and the receiving site.

While the processing operation shown in FIG. 4 is carried out by way of a software processing by the computer, such operation may be partly or entirely performed by a devoted hardware.

Returning to FIG. 2, a distance r1 between the GPS satellite, from which data is being received, and the point of reception is calculated at step 28, on the basis of the content of the memory Td, which stores the time delay required for the propagation and which is determined at step 27. Since the speed of propagation of the radio wave is equal to the speed of light, the time delay required for the propagation multiplied by the light of speed equals the distance r1.

At next step 29, an examination is made to see if the GPS satellite, from which data is being received, has already been registered as "verified". If the particular satellite is not found "verified", the operation proceeds to step 2A while if the satellite is "verified", the operation proceeds to step 2B.

Figure 6:
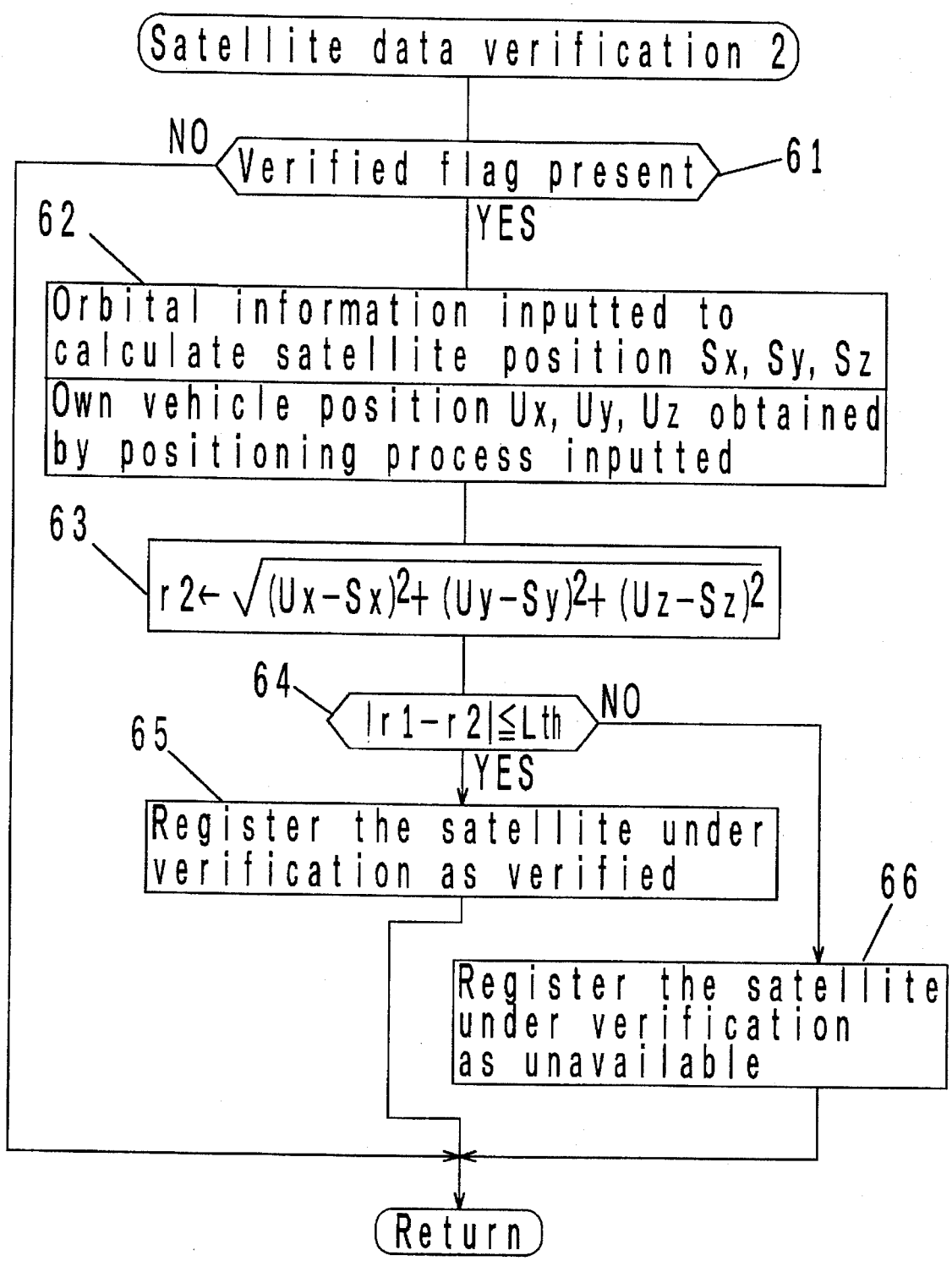
FIG. 6 is a flow chart showing a step 2A shown in FIG. 2 in detail.

The verification of data from GPS satellite is executed at step 2A, and is specifically illustrated in FIG. 6. Referring to FIG. 6, which shows "satellite data verification 2", the presence or absence of "verified" flag is examined at initial step 61. This flag is set during "satellite data verification 1" shown at step 2F of FIG. 2, and when it is set, this indicates that exact information representing the position of the own vehicle is available and the timing of the internal clock has already been corrected. When the flag is set, the operation proceeds to step 62 and otherwise, the verification is interrupted.

At step 62, orbital information (ephemeris data) of GPS satellite which is being verified is entered, and the current position of the satellite is calculated in terms of the three dimensional coordinates Sx, Sy, Sz. In addition, the three dimensional coordinates Ux, Uy, Uz representing the position of the own vehicle which is already detected during "three satellite positioning calculation" or "four satellites positioning calculation" to be described later, are transferred from a corresponding memory. At next step 63, the line-of-sight distance between the position of the satellite (Sx, Sy, Sz) and the position of the own vehicle (Ux, Uy, Uz) is calculated, and the result is denoted as a distance r2.

At next step 64, the absolute value of a difference between the distance r1 obtained at step 28 shown in FIG. 2 and the distance r2 obtained at the previous step 63 is compared against a threshold value Lth (e.g. 10 km). If it is found that |r1−r2|≦Lth, the operation proceeds to the next step 65, and otherwise proceeds to step 66. At step 65, "verified" information is stored in a memory at an address which is assigned to the identification number of the satellite being verified. At step 66, "unavailable" information is stored in a memory at an address which is assigned to the identification number of the satellite being verified.

As described above, the distance r1 is determined from the time delay representing the time required for the propagation of the radio wave from the transmitting to the receiving site while the distance r2 is obtained from information representing the position of the point of reception and the position of the satellite. Normally, a difference between r1 and r2 will be small, and accordingly as a result of such verification, the satellite being verified will be registered as "verified". However, in the event the satellite is travelling as deviated from a predetermined orbit, the satellite position which is represented by the orbital information transmitted therefrom will be different from the actual position, producing a large error in the distance r2, and hence in the difference between r1 and r2. In addition, if a failure occurs in the clock of the satellite, the Z-count transmitted from the satellite will deviate from the actual transmission timing, producing a large error in the distance r1, and hence in the difference between r1 and r2. In this manner, when the difference between r1 and r2 is large, this satellite is registered as "unavailable".

Thus, the verification shown in FIG. 6 enables a positive verification of data from the individual satellites. Since the operation is relatively simple, requiring reduced time consuming calculation resources and since there is no need to receive separate data from the satellites (in addition to the available data already received), the verification is achieved in a very brief period of time.

Returning to FIG. 2, the number of data entities received or the number of satellites, from which data has been received, is examined at step 2B. When the number of data entities is equal to two or less, the operation returns to step 22, switching the identification number of the satellite, from which data is to be received, followed by data reception therefrom. By repeating such operation, data transmitted from individual satellites is sequentially received. When data from three or more satellites is available, it becomes possible to determine the position of the point of reception or the own vehicle on the basis of such data, and accordingly, the positioning calculation is executed.

When the number of data entities received is equal to three, the operation proceeds from step 2B to step 2C where "three satellite positioning calculation" is executed. If the number of data entities received is equal to 4 or more, the operation proceeds from step 2B to step 2D where the presence or absence of "verified" flag is examined, and if the flag is cleared, the operation proceeds to step 2F while if the "verified" flag is set, "four satellites positioning calculation" takes place at step 2E.

The fundamental operation which takes place during "three satellites positioning calculation" at step 2C or "four satellites positioning calculation" at step 2E is well known, and hence will not be described in detail. However, briefly speaking, in the "three satellites positioning calculation", data received from three satellites are substituted, as parameters, into predetermined three simultaneous equations, which are solved to obtain unknown variables, namely, the latitude, the longitude of the point of reception as well as any error in the clock of the receiver side. The altitude of the point of reception is obtained, in this example, by calculation from a signal which is output from the altitude sensor 15, by substituting it into the equations as known data. In the "four satellites positioning calculation", data received from four satellites are substituted, as parameters, into predetermined four simultaneous equations, which are solved to obtain unknown variables, namely, the latitude, the longitude, the altitude of the point of reception as well as any error in the clock of the receiver side. Since an error involved in the clock of the receiver side is obtained as a result of the execution of either positioning calculation, the error may be utilized in correcting the time representation of the internal clock 16h.

Figure 5:
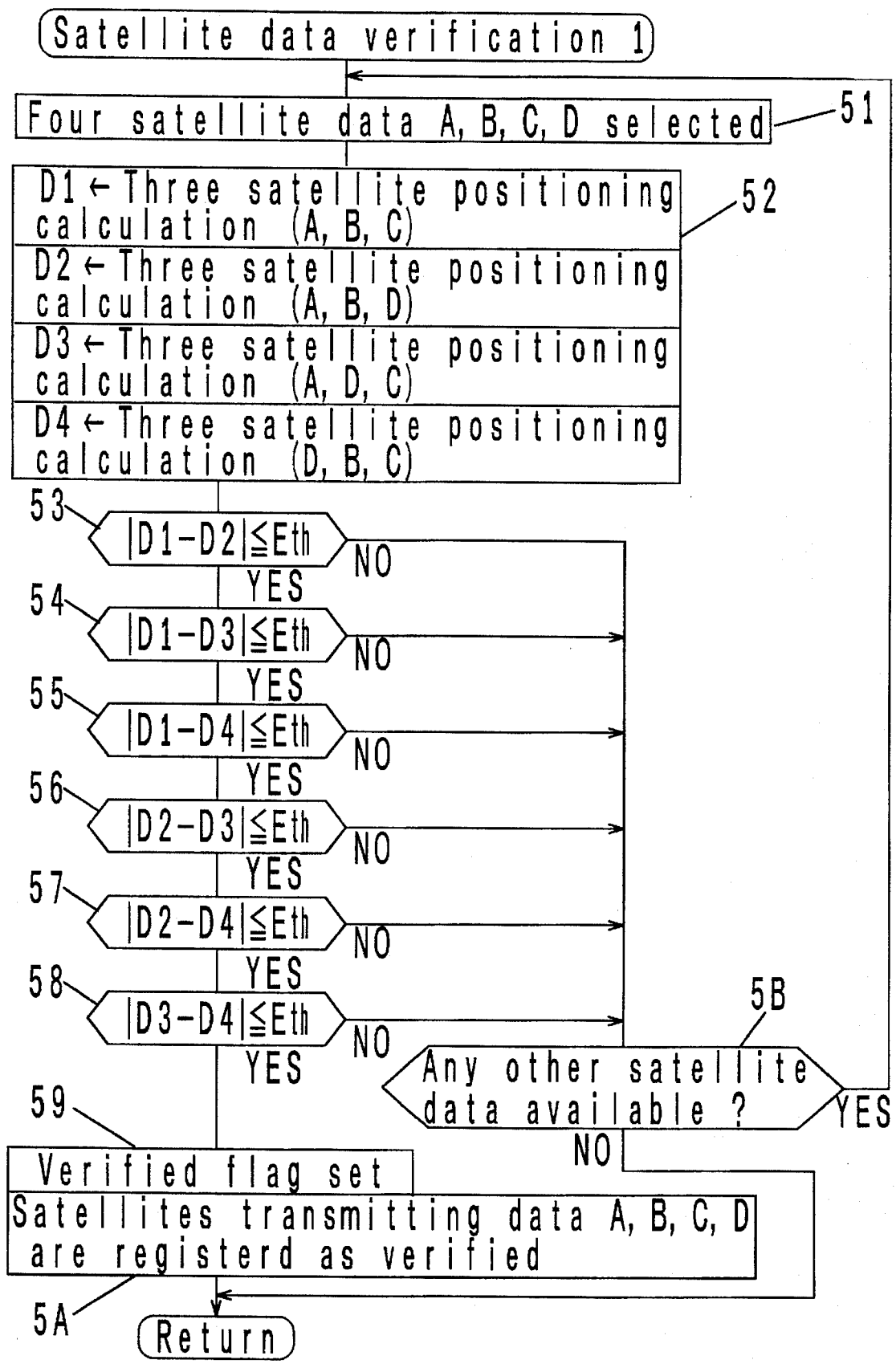
FIG. 5 is a flow chart showing a step 2F shown in FIG. 2 in detail.

Since the "verified" flag is cleared immediately after the power supply is turned on, the operation proceeds from step 2D to step 2F when four received data entities become available for the first time, followed by the execution of "satellite data verification 1", the detail of which is shown in FIG. 5, which will be described below.

At initial step 51, data from four satellites are chosen as A, B, C and D from all data previously received. At next step 52, a set of data A, B and C are used to execute "three satellites positioning calculation" (in the similar manner as occurring at step 2C), with a result of the positioning stored in a memory D1. Then, another set of data A, B and D are used to execute the "three satellites positioning calculation", with its result stored in a memory D2. A further set of data A, D and C is used to execute the "three satellites positioning calculation", with its result stored in a memory D3. Finally, a separate set of data D, B and C is used to execute the "three satellites positioning calculation", with its result stored in a memory D4.

At following step 53, the absolute value of a difference between the contents of the memories D1 and D2 is compared against the threshold value Eth. Similarly, at step 54, the absolute value of a difference between the contents of the memories D1 and D3 is compared against the threshold value Eth. At step 55, the absolute value of a difference between the contents of the memories D1 and D4 is compared against the threshold value Eth. At step 56, the absolute value of a difference between the contents of the memories D2 and D3 is compared against the threshold value Eth. At step 57, the absolute value of a difference between the contents of the memories D2 and D4 is compared against the threshold value Eth. At step 58, the absolute value of a difference between the contents of the memories D3 and D4 is compared against the threshold value Eth. When the results of all these comparisons is in the affirmative, namely, if all of |D1−D2|, |D1−D3|, |D1−D4|, |D2−D3|, |D2−D4| and |D3−D4| are found to be equal to or less than Eth, the operation proceeds to step 59 where the "verified" flag is set, followed by next step 5A where "verified" information is stored in memories which are assigned to all the GPS satellites which transmitted data A, B, C and D which were being verified.

If any one of |D1−D2|, |D1−D3|, |D1−D4|, |D2−D3|, |D2−D4| and |D3−D4| exceeds the threshold value Eth, the operation proceeds to step 5B. If there is available data received from other non-verified satellites in addition to the selected set of data A, B, C and D, the operation returns from step 5B to step 51, thus repeating the described operation utilizing a different combination of satellites being verified. If there is no other available data, the operation exits step 5B to return to the main routine.

When every data transmitted from the four selected satellites is found to be correct, it follows that a result of positioning which is obtained will be close to each other if the positioning calculation takes place with any combination of three data entities of them. Accordingly, "verified" flag is set, and every satellite which trans-mitted such data is registered as "verified" at step 59. However, in the event that any one of data delivered from these four satellites involves a large error, either one of |D1−D2|, |D1−D3|, |D1−D4|, |D2−D3|, |D2−D4| or |D3−D4| exceeds the threshold value Eth, and hence "verified" flag cannot be set.

Consequently, the verification shown in FIG. 5 allows every data delivered from the four satellites to be verified in an accurate manner. However, it will be noted that the positioning calculation mentioned must be repeated at least four times, meaning that this verification requires an increased length of time. Accordingly, in the present embodiment, initially, "satellite data verification 1" is executed to complete the verification of the four satellites, whereupon the "satellite data verification 2" shown in step 2A is executed each time data is received which is delivered from a satellite for which the verification has not yet been completed. As mentioned previously, the "satellite data verification 2" provides a result of verification in a brief length of time, and thus allows the availability of data can be quickly determined whenever data is received from a fresh satellite. However, it is to be noted that the execution of the "satellite data verification 2" requires exact positional information of the point of reception and also requires that the clock on the receiving side be precise. For this reason, the "satellite data verification 1" is initially executed, and after the "verified" flag is set, the "satellite data verification 2" is executed.

In the described embodiment, the result of the positioning calculation utilizing satellite data is used as positional information of the point of reception during the "satellite data verification 2", but, where the position of the point of reception is already known, the execution of the "satellite data verification 1" may be omitted by utilizing positional information which is entered by an operator or by utilizing data which is previously stored in a memory.

As described, in accordance with the invention, it is unnecessary to receive latest data again or to execute a complex positioning calculation whenever a data verification is required, thus simplifying data verification and drastically reducing the length of time required for the data verification as compared with the prior art.

While an embodiment of the invention has been disclosed above, it should be understood that the invention is not limited thereto, but that a number of changes, modifications and substitutions therein will readily occur to one skilled in the art without departing from the scope and spirit of the invention defined by the appended claims.

What is claimed is:

1. An apparatus for verifying global positioning system (GPS) satellite data and registering GPS satellites as verified, comprising:

receiver means for receiving information from a plurality of GPS satellites each of which delivers information relating to its own orbit and timing thereof;

positioning calculation means for calculating the position of a point of reception based on information received by said receiver means from the plurality of GPS satellites;

verified position determining means for determining a verified position of the point of reception based on information from at least three GPS satellites registered as available;

first distance calculating means for calculating a distance between an unverified GPS satellite and the point of reception based on positional information of the unverified GPS satellite which is determined from the received orbital information and from information relating to the verified position of the point of reception determined by said verified position determining means;

second distance calculating means for determining a time delay required for the propagation of information delivered from the unverified GPS satellite to the point of reception based on received timing information and the point in time when such timing information is received, and for calculating a distance between the unverified GPS satellite and the point of reception from such time delay;

first verifying means for verifying data of four or more GPS satellites, registering the four or more GPS satellites as verified and setting a verification flag, wherein said first verification means determines a plurality of positions of the point of reception based on combinations of three of four or more entities of information received from the four or more GPS satellites, said first verification means calculates differences between said plurality of positions, compares the differences with a first predetermined threshold, and registers the four or more satellites as verified and sets the verification flag if the differences are smaller than the first predetermined threshold, wherein said first verifying means operates if the verification flag is not set; and second verifying means for determining a difference between the distance determined by the first distance calculating means and the distance determined by the second distance calculating means, and for registering the unverified GPS satellite as one which is available for use in the calculation by the positioning calculation means whenever the difference is less than a second predetermined threshold and for registering the unverified GPS satellite as unavailable for use in the calculation by the positioning calculation means whenever the difference is greater than the second predetermined threshold, wherein said second verifying means operates when the verification flag is set.

2. An apparatus according to claim 1, wherein said second distance calculating means saves timing information contained in information delivered from the unverified GPS satellite whenever such timing information is detected, and then waits for the appearance of the leading end of a next subframe of such information, and upon detection of the leading end of the next subframe, calculates the time delay required for propagation of the timing information based on a difference between the point in time of reception of the leading end of the next subframe and the saved timing information.

3. An apparatus for verifying GPS satellite data comprising:

receiver means for receiving information from a plurality of GPS satellites each of which delivers information relating to its own orbit and timing thereof;

positioning calculation means for calculating the position of a point of reception based on information received by the receiver means from the plurality of GPS satellites;

verified position determining means for determining a verified position of the point of reception based on information received from at least three GPS satellites registered as available;

first distance calculating means for calculating a distance between an unverified GPS satellite and the point of reception based on positional information of the unverified GPS satellite determined from the received orbital information and information relating to the verified position of the point of reception determined by said verified position determining means;

second distance calculating means for determining a time delay required for propagation of information delivered from the unverified GPS satellite received at the point of reception based on received timing information and the point in time when such timing information is received, and calculating a distance between the unverified GPS satellite and the point of reception from the determined time delay;

verifying means for determining a difference between the distance determined by the first distance calculating means and the distance determined by the second distance calculating means, and registering the unverified GPS satellite as one which is available for use in the calculation by the positioning calculation means whenever the difference is less than a predetermined threshold and registering the unverified GPS satellite as unavailable for use in the calculation by the positioning calculation means whenever the difference is greater than the predetermined threshold, wherein said verifying means operates when a verification flag is set; and auxiliary verifying means for obtaining a plurality of positions of the point of reception based on combinations of three entities chosen from among four entities of information received from four GPS satellites, comparing a difference between any two of the plurality of positions with the threshold value, for determining whether the four GPS satellites are available for use in the calculation of the positioning calculation means, registering the four GPS satellites as available, and setting the verification flag, wherein said verifying means verifies remaining GPS satellites which are not registered as available after the four GPS satellites are registered as available by the auxiliary verifying means.

4. A method for verifying data from a satellite among a first plurality of satellites each of which transmits a signal, the method comprising the steps of:

a) receiving at a point of reception the signals transmitted from the first plurality of satellites and based on the received signals determining a position of the point of reception;

b) verifying data transmitted by each satellite of a second plurality of satellites, wherein each of said second plurality of satellites is included in the first plurality of satellites, wherein step b) comprises the steps of:

b1) performing satellite positioning calculations based on said second plurality of satellites thereby determining a plurality of positions;

b2) computing differences between said plurality of positions and comparing the differences with a first predetermined threshold value; and b3) registering as verified each of said second plurality of satellites if the differences computed in step b2) do not exceed the first predetermined threshold value;

c) selecting one of the first plurality of satellites which is not one of said second plurality of satellites, and verifying the data transmitted by the selected satellite, wherein step c) comprises the steps of:

c1) measuring a distance between the point of reception and the selected satellite, based on a time delay of the selected satellite signal;

c2) calculating a line-of-sight distance between the selected satellite and the position of the point of reception; and c3) comparing the range measured in step c1) with the line-of-sight distance calculated in step c2) and registering the selected satellite as verified if the comparison is less than a second predetermined threshold value; and d) repeating step c) when another one of the first plurality of satellites is selected which is not registered as verified.

5. The method recited in claim 4, wherein said first plurality of satellites are global positioning system (GPS) satellites.

6. The method recited in claim 4, wherein said second predetermined threshold value is 10 kilometers.

7. The method recited in claim 4, wherein the position of the point of reception is not accurately known prior to performing step a).

8. The method recited in claim 4, wherein in step b1) each one of the plurality of positions corresponds to a position of the point of reception calculated for a combination of the satellites of the second plurality of satellites.

9. The method recited in claim 4, wherein the second plurality of satellites consists of four or more satellites.

10. The method recited in claim 4, wherein the data from the selected satellite includes orbital information relating to a position of the selected satellite, and the line-of-sight distance calculated in step c2) is calculated based on the orbital information from the selected satellite and the previously determined position of the point of reception.

11. The method recited in claim 10, wherein said line-of-sight distance calculated in step c2) is represented by variable r2, where $$r2 = \sqrt{(Ux - Sx)^2 + (Uy - Sy)^2 + (Uz - Sz)^2}$$

such that the orbital information from the selected satellite is represented in three-dimensions by variables Sx, Sy, Sz and the position of the point of reception is represented in three-dimensions by variables Ux, Uy, Uz.

* * * * *